United States Patent
Lee et al.

(10) Patent No.: US 10,449,883 B2
(45) Date of Patent: Oct. 22, 2019

(54) APPARATUS AND METHOD FOR EVALUATING A SEAT BY USING BODY PRESSURE DISTRIBUTION

(71) Applicants: HYUNDAI MOTOR COMPANY, Seoul (KR); KIA MOTORS CORPORATION, Seoul (KR)

(72) Inventors: Baek Hee Lee, Suwon-si (KR); Yeong Sik Kim, Seoul (KR); Min Hyuk Kwak, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 189 days.

(21) Appl. No.: 15/601,084

(22) Filed: May 22, 2017

(65) Prior Publication Data
US 2018/0154808 A1    Jun. 7, 2018

(30) Foreign Application Priority Data
Dec. 7, 2016    (KR) .................. 10-2016-0165745

(51) Int. Cl.
  *B60N 2/00*     (2006.01)
  *B60N 2/90*     (2018.01)
  *G01L 9/00*     (2006.01)

(52) U.S. Cl.
  CPC ............. *B60N 2/914* (2018.02); *B60N 2/002* (2013.01); *A61G 2203/34* (2013.01); *G01L 9/0041* (2013.01)

(58) Field of Classification Search
  CPC ...... B60K 28/04; B60N 2/002; B60N 2/0248; B60W 2040/0881; A61G 2203/34
  See application file for complete search history.

(56) References Cited

U.S. PATENT DOCUMENTS

| | | | |
|---|---|---|---|
| 7,841,663 B2 | 11/2010 | Nathan | |
| 9,504,416 B2 * | 11/2016 | Young | B60N 2/0276 |
| 9,884,574 B2 * | 2/2018 | Mizoi | B60N 2/62 |
| 9,889,809 B2 * | 2/2018 | Ruthinowski | B60R 21/01512 |
| 9,975,452 B2 * | 5/2018 | Sugiyama | A61B 5/6893 |
| 10,112,505 B2 * | 10/2018 | Tanriover | B60N 2/002 |
| 2006/0283652 A1 * | 12/2006 | Yanai | G08B 21/06 180/272 |

(Continued)

FOREIGN PATENT DOCUMENTS

| | | |
|---|---|---|
| KR | 10-1351395 B | 1/2014 |
| KR | 10-1625651 B | 5/2016 |

*Primary Examiner* — Faye M Fleming
(74) *Attorney, Agent, or Firm* — Brinks Gilson & Lione

(57) ABSTRACT

The present disclosure relates to an apparatus and a method for evaluating a seat by using body pressure distribution. The apparatus includes: a body grid generator to generate body grids corresponding to body pressure data, which is measured while a driver is seated on a seat of a vehicle, based on the body pressure data and body information of the driver; a pressure analyzer to divide the body grids to a plurality of body grid areas based on body areas of the body pressure data and analyze the body pressure data included in the body grid areas; and a pressure evaluator to evaluate a body pressure for the seat based on the analyzed body pressure data of the body grid areas, and evaluate a hugging feeling of the driver for the seat based on the evaluated body pressure.

18 Claims, 6 Drawing Sheets

(56) References Cited

U.S. PATENT DOCUMENTS

2009/0008377 A1* 1/2009 Nathan .................. B60N 2/002
219/217
2018/0125413 A1* 5/2018 Smith, Jr. ................ A61B 5/00
2018/0281621 A1* 10/2018 Kaku ..................... B60N 2/002
2018/0297488 A1* 10/2018 Lem ..................... B60N 2/0232

* cited by examiner

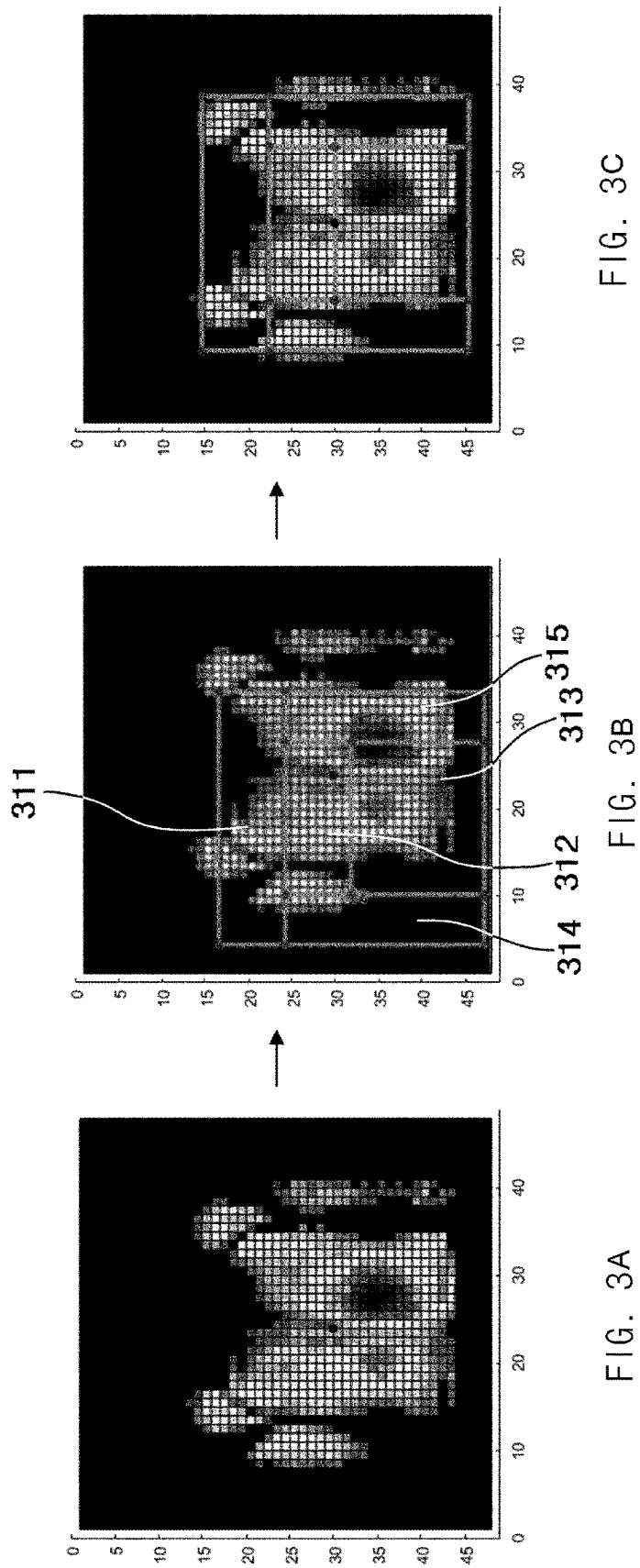

APPARATUS AND METHOD FOR EVALUATING A SEAT BY USING BODY PRESSURE DISTRIBUTION

CROSS-REFERENCE TO RELATED APPLICATION

This application claims priority to and the benefit of Korean Patent Application No. 10-2016-0165745, filed on Dec. 7, 2016, which is incorporated herein by reference in its entirety.

FIELD

The present disclosure relates to an apparatus and a method for evaluating seating comfort.

BACKGROUND

The statements in this section merely provide background information related to the present disclosure and may not constitute prior art.

As the number of persons who use vehicles has gradually increased and the fatigue of the drivers increases when the drivers travel a long distance, in recent years, the interests in maintaining the postures and/or comfortable states of the drivers who are seated in the seats of the vehicle also have increased.

Accordingly, studies on the structures of the seats of the vehicle are being actively made.

As an example, the pressures of the bodies of the drivers are maintained in stable postures by adaptably changing the structures of the seats according to regional pressure imposed by the backs, the shoulders, and the waists of the drivers.

However, we have discovered that it is difficult for the drivers or operators to directly identify the state of the body pressure distributions on the seat or the evaluation results of the driver's posture in terms of the pressure distribution, (e.g., the driving postures based on the pressure distributions) because the structures of the seats are changed according to the temporarily pressure distributions in the corresponding situations.

SUMMARY

The present disclosure provides an apparatus and a method for evaluating a seat by using body pressure distribution. In particular, body pressure appearance ratios, strange-pressure appearance ratios, and pressure appearance evenness may be analyzed based on body pressure distribution of a seat of a vehicle, and a body pressure and a hugging feeling for the seat may be evaluated based on the analysis result, and the evaluation result may be provided on a display screen.

The technical objects of the present disclosure are not limited to the above-mentioned one, and the other unmentioned technical objects will become apparent to those skilled in the art from the following description.

In accordance with an aspect of the present disclosure, there is provided an apparatus for evaluating a seat by using body pressure distribution. In particular, the apparatus includes: a body grid generator configured to generate body grids corresponding to body pressure data, which is measured while a driver is seated on a seat of a vehicle, based on the body pressure data and body information of the driver; a pressure analyzer configured to divide the body grids to a plurality of body grid areas based on body areas of the pressure data and analyze the body pressure data included in the plurality of body grid areas; and a pressure evaluator configured to evaluate a body pressure for the seat of the vehicle based on the analyzed body data of the plurality of body grid areas, and evaluate a hugging feeling of the driver for the seat based on the evaluated body pressure.

In another form of the present disclosure, there is provided a method for evaluating a seat based on body pressure distribution. More specifically, the method includes: generating, by a body grid generator, body grids corresponding to body pressure data, is the body pressure data measured while a driver is seated on a seat of a vehicle, based on the measured body pressure data and body information of the driver; dividing, by a pressure analyzer, the body grids to a plurality of body grid areas based on body areas of the body pressure data and analyzing the body pressure data included in the plurality of body grid areas; and evaluating, by a pressure evaluator, a body pressure for the seat of the vehicle based on the analyzed body pressure data of the body grid areas, and evaluating a hugging feeling of the driver for the seat of the vehicle based on the evaluated body pressure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3A is a view illustrating a screen of pressure data displayed on the display in one form of the present disclosure;

FIG. 3B is a view dividing body grids into several areas in one form of the present disclosure;

FIG. 3C is a view illustrating correction to locations of body grids by comparing centers of gravity of the body grids and the center of gravity of the pressure data in one form of the present disclosure;

Figure 1:
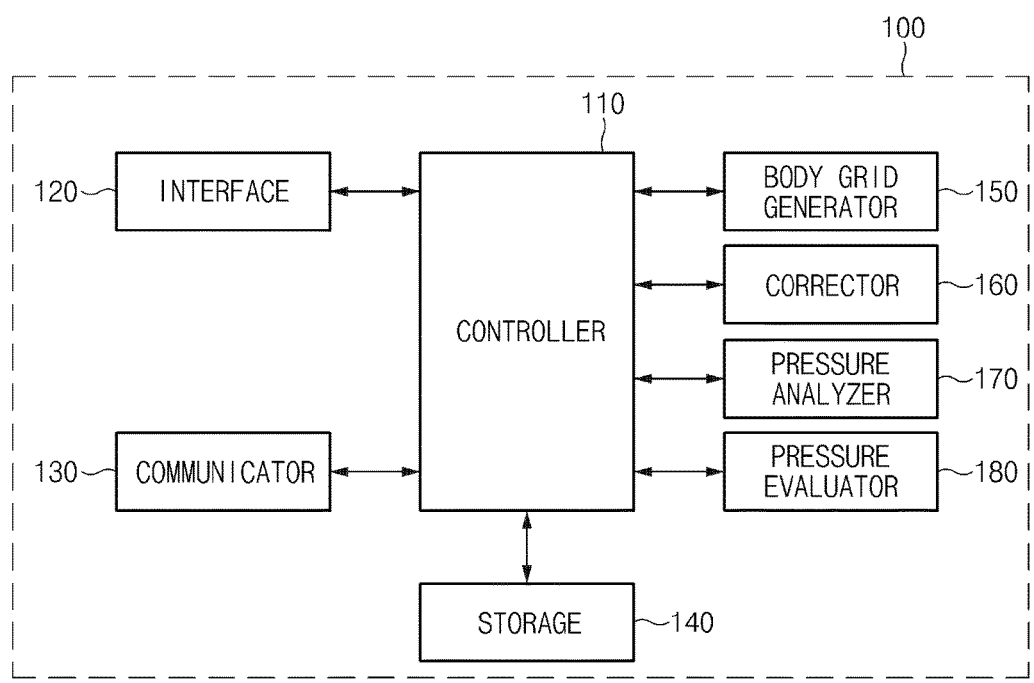
FIG. 1 is a block diagram illustrating a configuration of an apparatus for evaluating a seat by using body pressure distribution, in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

FIG. 1 is a block diagram illustrating a configuration of an apparatus for evaluating a seat by using body pressure distribution, in one form of the present disclosure.

The apparatus 100 for evaluating a seat by using body pressure distribution (hereinafter, referred to as 'a seat evaluating apparatus') may embodied in the interior of a vehicle. Then, the apparatus 100 for evaluating a seat by using body pressure distribution may be integrally formed with control units in the interior of the vehicle, and may be embodied as a separate apparatus to be connected to the control units of the vehicle by a separate connection unit.

Accordingly, referring to FIG. 1, the seat evaluating apparatus 100 may include a controller 110, an interface 120, a communicator 130, a storage 140, a body grid generator 150, a corrector 160, a pressure analyzer 170, and a pressure evaluator 180. Here, the controller 110 may process signals delivered between the elements of the seat evaluating apparatus 100.

The interface 120 may include an input unit that receives a control command from a user, and an output unit that outputs an operation state and a result of the seat evaluating apparatus 100.

The input unit may receive a call command for pre-stored pressure data of the user, from the user. Further, the input unit may receive body information for generating body grids, for example, a sitting-shoulder height and a sitting-hip breadth, from the user.

Here, the input unit may include a key button, and may include a mouse, a joystick, a jog shuttle, and a stylus pen. Further, the input unit may include a soft key that is embodied on a display.

The output unit may include a display. Then, the output unit may display a pressure analysis result of the pressure analyzer 170 on the display, and may display a hugging feeling evaluation result of the seat on the display. Further, the output unit may include a voice output unit such as a speaker.

When a touch sensor, such as a touch film, a touch sheet, a touch pad, is provided in the display, the display may be operated as a touch screen, and may be embodied in a form in which an input unit and an output unit are integrated.

Here, the display may include at least one of a liquid crystal display (LCD), a thin film transistor-liquid crystal display (TFT-LCD), an organic light-emitting diode (OLED), a flexible display, a field emission display (FED), and a 3D display.

The communicator 130 may include a communication module that supports a communication interface with electronic components and/or control units provided in the vehicle. As an example, the communication module may receive pressure data measured by the sensors of the vehicle to be stored, from a vehicle control system. Further, the communication module may transmit and receive signals to and from the sensors of the vehicle, and may receive pressure data from the sensors. Further, the communication module may transmit and receive signals to and from a display device provided in the vehicle.

Here, the communication module may include a module that supports network communication of the vehicle, such as controller area network (CAN) communication, local interconnect network (LIN), or Flex-Ray communication.

Meanwhile, the communication module may include a module for wireless internet connection or a module for short range communication. Here, the wireless internet technology may include wireless LAN (WLAN), wireless broadband (WiBro), Wi-Fi, or world interoperability for microwave access (WiMax), and the short range communication technology may include Bluetooth, ZigBee, ultra-wideband (UWB), radio frequency identification (RFID), and infrared data association (IrDA).

The storage 140 may store data and/or algorithms that are desired for operating the seat evaluating apparatus 100.

As an example, the storage 140 may store a command and/or a preset value for controlling an operation of removing noise from pressure data, an operation of generating body grids, an operation of correcting the locations of the body grids, an operation of analyzing a body pressure, and/or an operation of evaluating a hugging feeling of the seat, and may store algorithms for performing the operations. Further, the storage 140 may store a pressure analysis result and a hugging feeling evaluation result of the seat.

Here, the storage 140 may include storage media, such as a random access memory (RAM), a static random access memory (SRAM), a read-only memory (ROM), a programmable read-only memory (ROM), and an electrically erasable programmable read-only memory (EEPROM).

If a pressure data call command of the user is input through the input unit, the controller 110 calls pre-stored pressure data of the user and displays the called pressure data.

Then, the corrector 160 may remove noise from the pressure data displayed on the display.

The body grid generator 150 generates body grids corresponding to the pressure data displayed on the display.

Referring to FIGS. 2A-2D, if body information, such as a sitting-shoulder height and a sitting-hip breadth (see, FIG. 2D), is input through the input unit, the body grid generator 150 sets a body grid ratio based on the input body information. Further, the body grid generator 150 calculates the centers of gravity of the body grids, by using the pressure data, from which noise has been removed. The body grid generator 150 may calculate coordinates of the body grids with reference to the centers of gravity of the body grids.

Figure 2D:
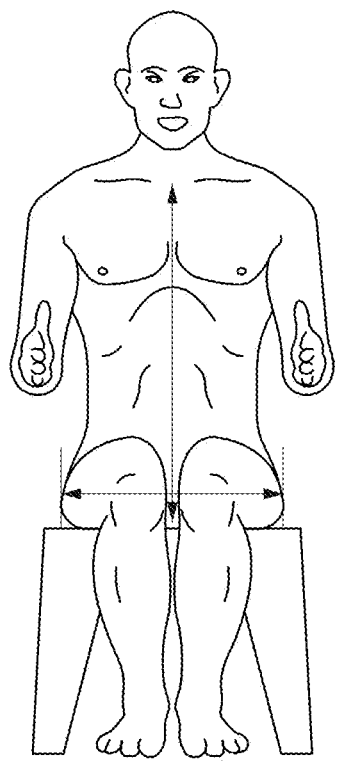
FIG. 2D is an illustration of a driver sitting on a seat in one form of the present disclosure.
Figure 2A:
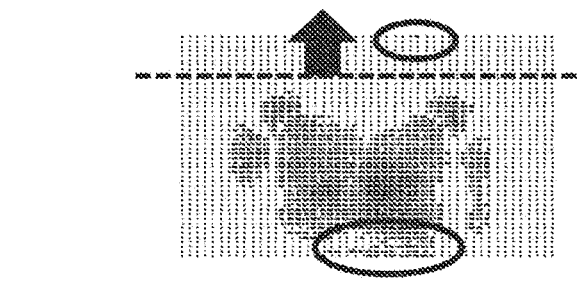
FIG. 2A is a view illustrating an operation of removing noise from pressure data by the apparatus for evaluating a seat in one form of the present disclosure.

FIG. 2A illustrates an operation of removing noise from pressure data by the corrector 160.

Figure 2B:
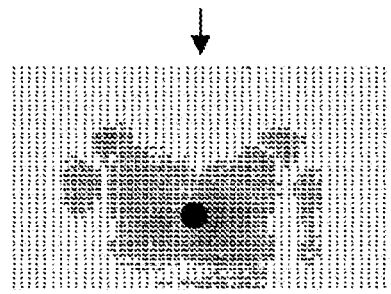
FIG. 2B is a view illustrating calculated centers of gravity of the body grids by the apparatus for evaluating a seat in one form of the present disclosure.
Figure 2C:
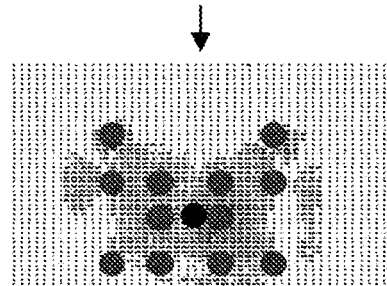
FIG. 2C is a view illustrating coordinates of the body grids with reference to the centers of gravity of the body grids in one form of the present disclosure.

If noise is removed from pressure data by the corrector 160 as illustrated in FIG. 2A, a body grid ratio is set based on body information, such as a sitting-shoulder height and a sitting-hip breadth, which is input through the input unit, and the centers of gravity of the body grids are calculated by using the pressure data, from which noise has been removed, as illustrated in FIG. 2B. Further, as illustrated in FIG. 2C, the body grid generator 150 calculates coordinates of the body grids with reference to the centers of gravity of the body grids calculated in FIG. 2C.

Here, the body grid generator 150 may determine coordinates of apexes corresponding to a body area of the pressure data, from the calculated coordinates of the body grids, and may generate body grids by connecting the apexes by lines.

Then, the grid generator 150 divides the body area into an upper back, a middle back, and a lower back, and left and right sides, and generates the body grids corresponding to the areas. As an example, the body grid area corresponding to the upper back may be defined as a first area, the body grid area corresponding to the middle back may be defined as a second area, the body grid area corresponding to the lower back may be defined as a third area, the body grid area corresponding to the left side may be defined as a fourth area, and the body grid area corresponding to the right side may be defined as a fifth area. Of course, it is apparent that this is a simple example and a reference for dividing the body grid area may vary according to the forms.

The body grid generator 150 may display the generated body grids and pressure data together. The body grid generator 150 may display the body grids such that the body grids overlap a screen of the pressure data.

The corrector 160 compares the centers of gravity of the body grids and the center of gravity of the pressure data. If the difference between the centers of gravity of the body grids and the center of gravity of the pressure data exceeds a specific range, the corrector 160 may correct the locations of the displayed body grids such that the body grids overlap the screen of the pressure data.

Here, the body grids are displayed such that the body grids overlap the display screen of the pressure data, and FIGS. 3A, 3B and 3C are referenced for one form of correcting the locations of the body grids.

FIG. 3A illustrates a screen of pressure data displayed on the display. Then, the body grid generation unit 150 may generate body grids by using body information input through the input unit, the body grid ratio, and the center of gravity, and may display the body grids such that the body grids overlap the screen of the pressure data.

As illustrated in FIG. 3B, the body grids may be divided into five areas of a first area 311, a second area 312, a third area 313, a fourth area 314, and a fifth area 315.

Thereafter, as illustrated in FIG. 3C, the corrector 160 may correct the locations of the body grids by comparing the centers of gravity of the body grids and the center of gravity of the pressure data.

The pressure analyzer 170 analyzes body pressures for areas of the body grids. As an example, the pressure analyzer 170 analyzes body pressures for the first to fifth areas of the body grids.

Then, the pressure analyzer 170 may calculate pressure appearance ratios (PARs), strange-pressure appearance ratios (S-PARs), and pressure appearance evenness (PAES), for the first to fifth areas of the body grids.

First, the pressure analyzer 170 may calculate pressure appearance ratios (PARs) for the first to fifth areas of the body grids by using Equation 1. Here, a pressure appearance ratio (PAR) refers to a ratio (%) of a pressure generating cell with respect to all cells in an area of the body grids.

$$PAR[\%] = \sum_{j=1}^{m} \frac{\sum_{i=1}^{n} x_i}{n} \times 100 \quad \text{[Equation 1]}$$

In Equation 1, m indicates the number of body grid areas, n indicates the number of all cells in a j-th area of the body grids, and x indicates a bit value of an i-th cell. Here, x is 1 in the case of a pressure generating cell, and is 0 otherwise.

According to Equation 1, the pressure appearance ratios (PARs) for the first to fifth areas of the body grids increase as the contact area of the seat of the vehicle and the body of the user increases.

Further, the pressure analyzer 170 may calculate strange-pressure appearance ratios (S-PARs) for the first to fifth areas of the body grids by using Equation 2 below. Here, the strange-pressure appearance ratios (S-PARs) refer ratios (%) at which valley pressure cells compared with the pressure generating cells are generated. A valley pressure cell refers to a cell in which a difference between the body pressure thereof and the body pressures of an adjacent cell is less than 0.3 psi.

$$S-PAR[\%] = \sum_{j=1}^{m} \frac{\sum_{i=1}^{k} x_i}{k} \times 100 \quad \text{[Equation 2]}$$

In Equation 2, m indicates the number of body grid areas, k indicates the number of pressure generating cells, and x indicates the bit value of an i-th cell. Here, x is 1 if the difference between the pressures is more than 0.3 psi, and is 0 otherwise.

According to Equation 2, the strange-pressure appearance ratios (S-PARs) for the first to fifth areas of the body grids decrease as the seat of the vehicle and the body continue to contact each other.

First, the pressure analyzer 170 may calculate the pressure appearance evenness (PAE) for the first to fifth areas of the body grids by using Equation 3. Here, the pressure appearance evenness (PAE) refers to the coefficient of variation (CV) of the body pressure of the target cell for analysis. Here, a coefficient of variation refers to a value obtained by dividing a standard variation by an average value.

$$PAE[\%] = \sum_{j=1}^{m} \frac{\sqrt{\frac{\sum_{i=1}^{n}(y_i - \mu)}{n}}}{\mu} \times 100 \quad \text{[Equation 3]}$$

In Equation 3, m indicates the number of body grid areas, n indicates the number of all cells in a j-th area of the body grids, y indicates a body pressure of an i-th cell, and μ indicates an average body pressure of the target cell for analysis. Here, μ may be calculated by using Equation 4.

$$\mu = \frac{\sum_{i=1}^{n} x_i}{n}$$ [Equation 4]

In Equation 4, n indicates the number of all target cells for analysis and x indicates a bit value of an i-th cell. Here, x is 1 in the case of a pressure generating cell, and is 0 otherwise.

According to Equation 3, the coefficients of variation of the target cells for analysis for the first to fifth areas of the body grids decrease as the seat of the vehicle and the body contact each other more uniformly.

The pressure evaluator 180 evaluates a pressure appearance ratio (PAR), a strange-pressure appearance ratio (S-PAR), and a pressure appearance evenness (PAE) by using the pressure appearance ratios (PARs), the strange-pressure appearance ratios (S-PARs), and the pressure appearance evenness (PAE) for the first to fifth areas of the body grids, which are calculated by the pressure analyzer 170. The pressure evaluator 180 may endow the areas of the body grids with weights, and may evaluate a pressure appearance ratio (PAR), a strange-pressure appearance ratio (S-PAR), and a pressure appearance evenness (PAE) by applying weights to the pressure appearance ratios (PARs), the strange-pressure appearance ratios (S-PARs), and the pressure appearance evenness (PAE) for the first to fifth areas of the body grids, which are calculated by the pressure analyzer 170.

Further, the pressure evaluator 180 may evaluate a hugging feeling for the seat of the vehicle based on the evaluation results for the pressure appearance ratios (PARs), the strange-pressure appearance ratios (S-PARs), and the pressure appearance evenness (PAE). Here, the pressure evaluator 180 may deduce the evaluation result for the hugging feeling for the seat of the vehicle in a form of a hugging index (HI).

The pressure evaluator 180 may deliver the evaluation results for the pressure appearance ratios (PARs), the strange-pressure appearance ratios (S-PARs), and the pressure appearance evenness (PAE) for the seat of the vehicle and the hugging feeling evaluation result to the controller 110 to display the results through the display screen of the interface 120.

Figure 4:
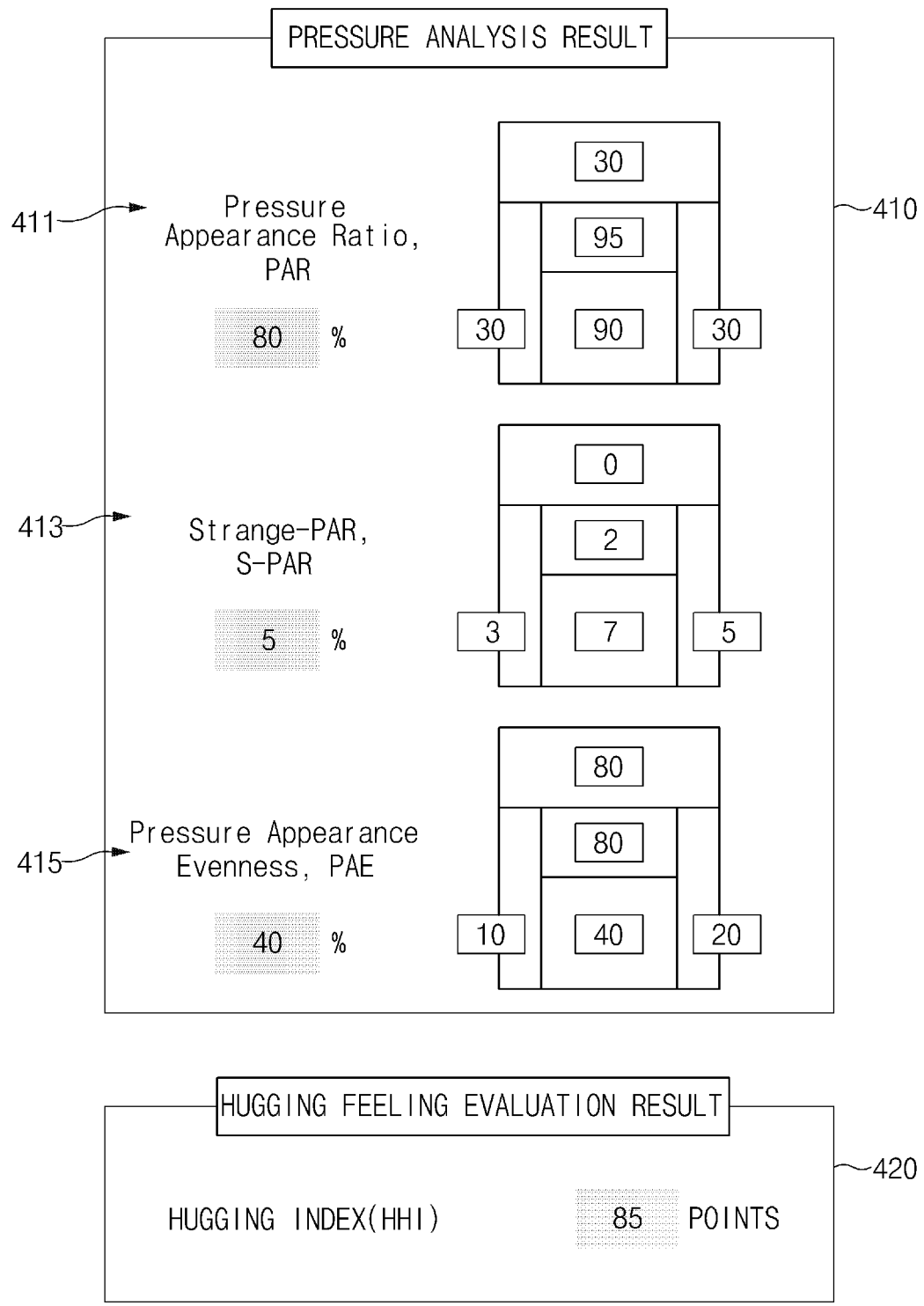
FIG. 4 is a view illustrating a display showing evaluation results in one form of the present disclosure.

One form of displaying the evaluation results for the pressure appearance ratios (PARs), the strange-pressure appearance ratios (S-PARs), and the pressure appearance evenness (PAE) for the seat of the vehicle and the hugging feeling evaluation result will be referenced through FIG. 4.

Referring to FIG. 4, reference numeral 410 denotes the evaluation results, and 411, 413, and 415 respectively represent the pressure appearance ratios (PARs), the strange-pressure appearance ratios (S-PARs), and the pressure appearance evenness (PAE) for the seat of the vehicle. The reference numeral 420 denotes the hugging feeling evaluation result (for example, the hugging index).

An operational flow of the apparatus in one form of the present disclosure will be described in detail.

Figure 5:
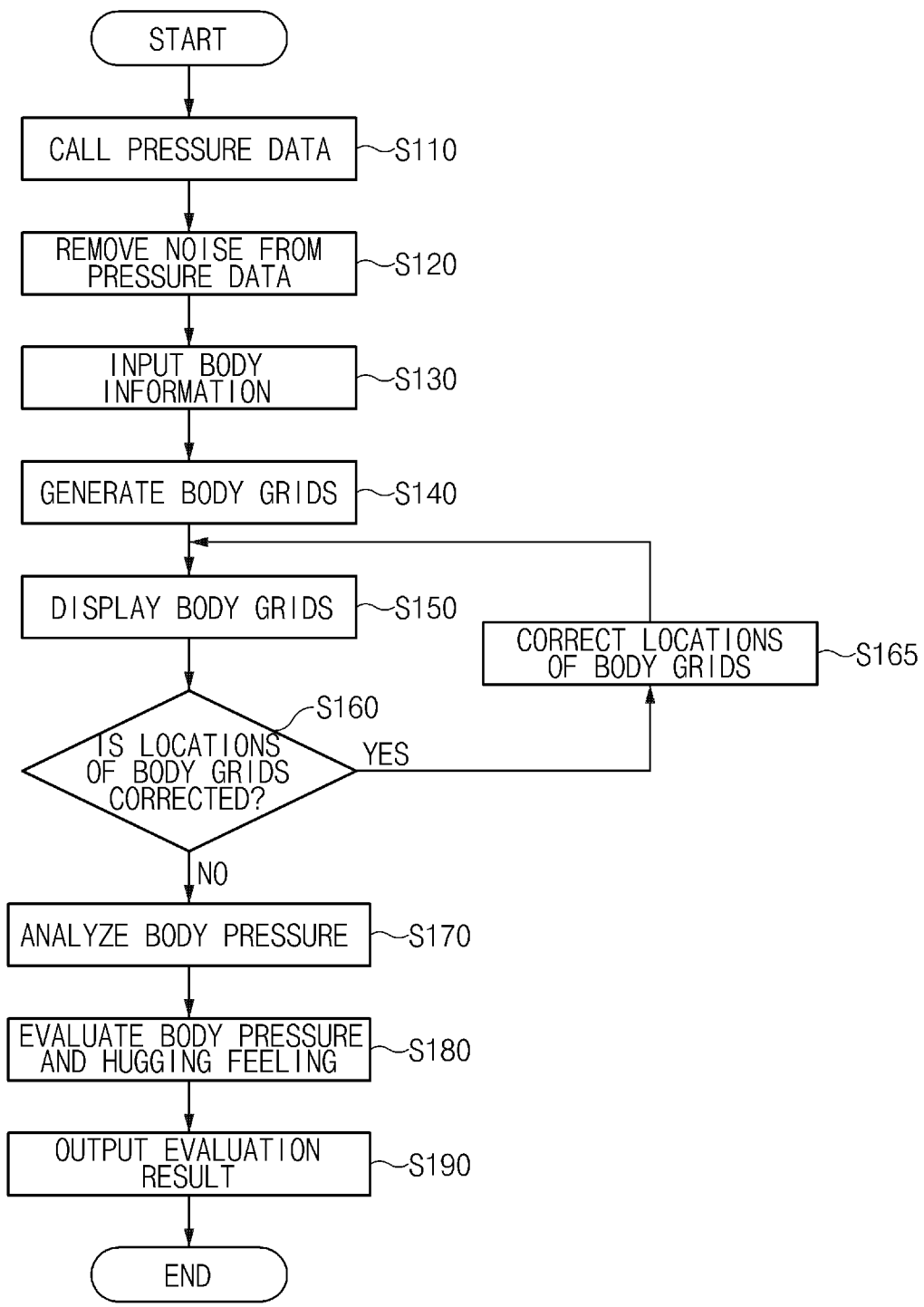
FIG. 5 is a flow chart illustrating a process of an operation of removing noise from pressure data by evaluating a seat in one form of the present disclosure.

FIG. 5 is a flowchart illustrating a process of an operation of evaluating a seat by using body pressure distribution, in one form of the present disclosure.

As illustrated in FIG. 5, the seat evaluating apparatus 100 calls pressure data of the user (S110), and removes noise from the pressure data (S120).

Here, the body pressure may be received from the sensors of the vehicle in real time, and may be measured by the sensors of the vehicle in advance to be stored.

Further, the seat evaluating apparatus 100 may receive body information such as a height of the shoulder in a seated state and a width of the hips in a seated state, through the input unit (S130).

If the body information is input in process S130, the seat evaluating apparatus 100 generates body grids based on the input body information (S140). In process S140, the seat evaluating apparatus 100 may sets a body grid ratio by using body information, such as a sitting-shoulder height and a sitting-hip breadth, may calculate the centers of gravity of the body grids by using the pressure data, and may calculate coordinates of the grids with reference to the centers of gravity of the body grids. Further, the seat evaluating apparatus 100 may determine coordinates of apexes of the body grids by using the coordinates of the body grids, and may generate body grids by connecting the apexes by lines. Here, the seat evaluating apparatus 100 may generate a plurality of body grids and areas for respective parts of the body of the user.

The seat evaluating apparatus 100 may display the body grids generated in process S140 together with the pressure data on the screen of the display (S150). The seat evaluating apparatus 100 may display the body grids such that the body grids overlap the screen of the pressure data.

If the difference between the centers of gravity of the body grids and the center of gravity of the pressure data exceeds a specific range, the seat evaluating apparatus 100 may correct the locations of the displayed body grids such that the body grids overlap the screen of the pressure data (S160 and S165).

Thereafter, the seat evaluating apparatus 100 analyzes body pressures for the areas of the body grids (S170). In process S170, the seat evaluating apparatus 100 may calculate the pressure appearance ratios (PARs), the strange-pressure appearance ratios (S-PARs), and the pressure appearance evenness (PAE) for the body grid areas generated for the parts of the body, for example, the first to fifth areas.

The seat evaluating apparatus 100 evaluates the body pressure of the seat of the vehicle by using the pressure appearance ratios (PARs), the strange-pressure appearance ratios (S-PARs), and the pressure appearance evenness (PAE) for the first to fifth areas of the body grids calculated in process S170, and evaluates the hugging feeling for the seat of the vehicle based on the pressure evaluation result (S180).

The seat evaluating apparatus 100 may display the pressure evaluation result and the hugging evaluation result of process S180 through the display screen of the interface 120 (S190).

The seat evaluating apparatus 100 may be embodied in a form of an independent hardware apparatus, may be included in another hardware apparatus such as a microprocessor or a general-purpose computer system, as at least one processor.

Figure 6:
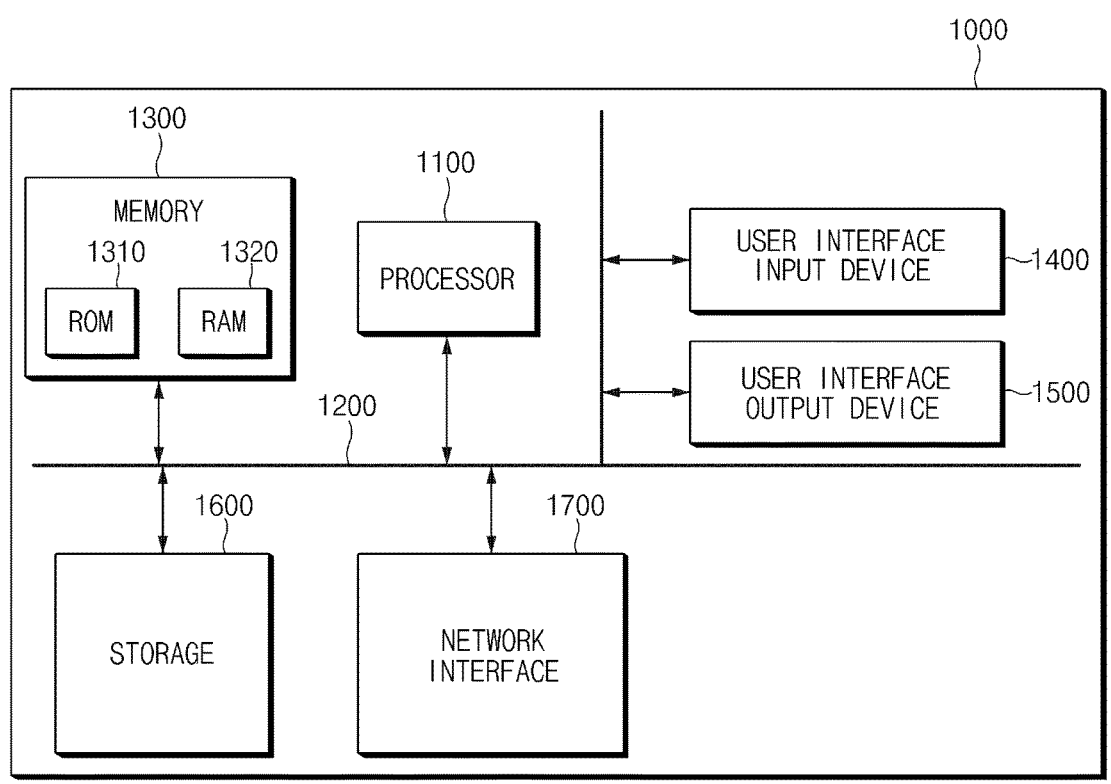
FIG. 6 is a block diagram illustrating a configuration of a computing system that executes the method in one form of the present disclosure.

FIG. 6 is a block diagram illustrating a configuration of a computing system that executes the method in one form of the present disclosure.

Referring to FIG. 6, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory 1310 (ROM) and a random access memory 1320 (RAM).

Accordingly, the steps of the method or algorithm described in relation to the forms of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EFPROM memory, a register, a hard disk, a detachable disk, or a CD-ROM. The exemplary storage medium is coupled to the processor 1100, and the processor 1100 may read information from the storage medium and may write information in the storage medium. In another form, the storage medium may be integrated with the processor 1100. The processor and the storage medium may reside in an application specific integrated circuit (ASIC). The ASIC may reside in a user terminal. In another form, the processor and the storage medium may reside in the user terminal as an individual component.

In one form of the present disclosure, the pressure appearance ratios (PARs), the strange-pressure appearance ratios (S-PARs), and the pressure appearance evenness (PAE) may be analyzed based on the body pressure distribution of the seat of the vehicle. The pressure and hugging feeling for the seat may be evaluated based on the analysis result, and the evaluation result may be displayed on the screen.

The above description is a simple exemplification of the technical spirit of the present disclosure, and the present disclosure may be variously corrected and modified by those skilled in the art to which the present disclosure pertains without departing from the desired features of the present disclosure.

Therefore, the disclosed forms of the present disclosure do not limit the technical spirit of the present disclosure but are illustrative, and the scope of the technical spirit of the present disclosure is not limited by the forms of the present disclosure. It will be understood that all the technical spirits within the equivalent range fall within the scope of the present disclosure.

What is claimed is:

1. An apparatus for evaluating a seat by using body pressure distribution, the apparatus comprising:
   a body grid generator configured to generate body grids corresponding to body pressure data, which is measured while a driver is seated on a seat of a vehicle, based on the body pressure data and body information of the driver;
   a pressure analyzer configured to divide the body grids to a plurality of body grid areas based on body areas of the body pressure data and analyze the body pressure data included in the plurality of body grid areas;
   a pressure evaluator configured to evaluate a body pressure for the seat based on the analyzed body pressure data of the plurality of body grid areas, and evaluate a hugging feeling of the driver for the seat based on the evaluated body pressure; and
   an interface unit configured to display the body pressure data and the body grids on a display screen,
   wherein the body grids are displayed such that the body grids overlap a screen of the body pressure data.

2. The apparatus of claim 1, wherein the body information includes a height of a shoulder of the driver in a seated state and a width of hips of the driver in the seated state, and
   wherein the body grid generator is configured to set a body grid ratio based on the body information.

3. The apparatus of claim 1, wherein the body grid generator is configured to calculate coordinates of the body grids base on centers of gravity of the body grids calculated based on the body pressure data, and generate the body grids by connecting coordinates of a plurality of apexes determined by using the coordinates of the body grids by lines.

4. The apparatus of claim 1, wherein the body grid generator is configured to divide at least one body area of the plurality of the body areas into an upper back, a middle back, a lower back, a left side, and a right side.

5. The apparatus of claim 1, wherein the pressure analyzer is configured to calculate pressure appearance ratios, strange-pressure appearance ratios, and pressure appearance evenness for the plurality of body grid areas.

6. The apparatus of claim 5, wherein the pressure analyzer is configured to extract a pressure generating cell from all cells in the plurality of body gird areas, and calculate a pressure appearance ratio for each body grid area of the plurality of body grid areas by comparing all the cells with the pressure generating cell.

7. The apparatus of claim 5, wherein the pressure analyzer is configured to extract a valley pressure cell, in which a difference between a pressure of the valley pressure cell and a pressure of an adjacent cell is greater than a reference value in each of the body grid areas, and the pressure analyzer is configured to calculate a strange-pressure appearance ratio for each of the body grid areas by comparing the pressure appearance cell with the valley pressure cell.

8. The apparatus of claim 5, wherein the pressure analyzer is configured to calculate the pressure appearance evenness for the plurality of body grid areas by comparing an average body pressure of all the cells in each of the body grid areas with a body pressure of each of the cells.

9. The apparatus of claim 5, wherein the pressure evaluator is configured to calculate a hugging feeling index of the driver for the seat based on the pressure appearance ratios, the strange-pressure appearance ratios, and the pressure appearance evenness for the plurality of body grid areas.

10. The apparatus of claim 1, further comprising:
    a corrector configured to:
    remove noise from the body pressure data,
    compare centers of gravity of the body grids with a center of gravity of the body pressure data, and
    when a difference between the centers of gravity of the body grids and the center of gravity of the body pressure data exceed a specific range, correct locations of the body grids.

11. The apparatus of claim 1, wherein the body pressure data is received from sensors in the vehicle while the driver is seated on the seat of the vehicle.

12. The apparatus of claim 1, wherein the body pressure data is measured by sensors in the vehicle to be stored, while the driver is seated on the seat in advance.

13. A method for evaluating a seat by using body pressure distribution, the method comprising:
    generating, by a body grid generator, body grids corresponding to body pressure data, measured while a driver is seated on a seat of a vehicle, based on the measured body pressure data and body information of the driver;

dividing, by a pressure analyzer, the body grids into a plurality of body grid areas based on body areas of the body pressure data and analyzing the body pressure data included in the plurality of body grid areas;

evaluating, by a pressure evaluator, a body pressure for the seat based on the analyzed body pressure data of the plurality of the body grid areas, and evaluating a hugging feeling of the driver for the seat based on the evaluated body pressure; and displaying the body pressure data on a display screen, and displaying the body grids such that the body grids overlap the screen of the body pressure data.

14. The method of claim 13, wherein the step of generating of the body grids further includes:

setting a body grid ratio based on the body information including a height of a shoulder of the driver in a seated state and a width of hips of the driver in the seated state.

15. The method of claim 13, wherein the step of generating of the body grids further includes:

calculating centers of gravity of the body grids based on the body pressure data;

calculating coordinates of the body grids based on the centers of gravity of the body grids;

determining coordinates of apexes for the plurality of body areas of the body pressure data from the coordinates of the body grids; and generating the body grids by connecting the coordinates of the apexes by lines.

16. The method of claim 13, wherein the step of generating of the body grids further includes:

dividing at least one body area of the plurality of body areas into an upper back, a middle back, a lower back, a left side and a right side.

17. The method of claim 13, wherein the step of analyzing of the pressure data includes:

extracting a pressure generating cell from all cells in the plurality of body gird areas, and calculating a pressure appearance ratio for each body grid area of the plurality of body grid areas by comparing all the cells with the pressure generating cell;

extracting a valley pressure cell, in which a difference between a pressure of the valley pressure cell and a pressure of an adjacent cell is greater than a reference value in each of the body grid areas, and calculating a strange-pressure appearance ratio for each of the body grid areas by comparing the pressure appearance cell with the valley pressure cell; and calculating the pressure appearance evenness for the plurality of body grid areas by comparing an average body pressure of all the cells in each of the body grid areas with a body pressure of each of the cells.

18. The method of claim 13, further comprising:

prior to analyzing the body pressure data, comparing a center of gravity of the body grids with a center of gravity of body the pressure data, and when a difference between the center of gravity of the body grids and the center of gravity of the body pressure data exceed a specific range, correcting locations of the body grids.

* * * * *